(12) United States Patent
Piatt et al.

(10) Patent No.: US 6,980,330 B1
(45) Date of Patent: Dec. 27, 2005

(54) COLOR TABLE LEVEL RESERVATION

(75) Inventors: Michael J. Piatt, Dayton, OH (US);
Christopher L. Watkins, Fairborn, OH (US)

(73) Assignee: Eastman Kodak Company, Rochester, NY (US)

( * ) Notice: Subject to any disclaimer, the term of this patent is extended or adjusted under 35 U.S.C. 154(b) by 394 days.

(21) Appl. No.: 09/597,437

(22) Filed: Jun. 20, 2000

(51) Int. Cl.[7] .............................................. H04N 1/407
(52) U.S. Cl. ...................... 358/3.26; 358/521; 382/275
(58) Field of Search .............................. 358/3.01, 3.24, 358/3.26, 521; 382/275; 348/246

(56) References Cited

U.S. PATENT DOCUMENTS

| | | | | |
|---|---|---|---|---|
| 5,757,975 A | * | 5/1998 | Eschbach et al. | 382/251 |
| 6,031,559 A | * | 2/2000 | Ng | 347/251 |
| 6,295,384 B1 | * | 9/2001 | Into | 382/275 |

* cited by examiner

*Primary Examiner*—Thomas D Lee
(74) *Attorney, Agent, or Firm*—Barbara Joan Haushalter

(57) ABSTRACT

The present invention addresses problems encountered in the conversion of continuous tone data into binary data for printing on low resolution imaging systems. Representation of the continuous tone data is only roughly approximated through the conversion to binary data. Artifacts of the binary printing process are objectionable for several reasons. They decrease over all image quality and may sometimes allow for only partial representation of the original data. Partially formed and/or irregularly formed text characters are one such example. This invention addresses this problem by forcing certain levels to be processed through predictable dot dispersion patterns so as to preserve pre-identified portions of the input data stream. Continuous tone image data for imaging on a digital output device is processed by identifying at least one problematic tone level in the binary representation of the image, and identifying at least one non-problematic tone level in the binary representation of the image. Data transformation is then applied to cause the digital output device to replace the at least one problematic tone level in the binary representation of the image with output at the at least one non-problematic tone level in the binary representation of the image.

5 Claims, 1 Drawing Sheet

COLOR TABLE LEVEL RESERVATION

TECHNICAL FIELD

The present invention relates to image processing and, more particularly, to optimizing data specific image quality from a low resolution printing system.

BACKGROUND ART

Ink jet printing systems are known in which a print head defines one or more rows of orifices which receive an electrically conductive recording fluid, such as for instance a water based ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

In the art of image processing it is known that the use of lookup tables (LUT's) provide the flexibility to manipulate incoming device-independent data and to transform it into device-specific output data. This process is used to correct the color from input devices, such as scanners, for use as output files suitable for printers. One example of such a transformation is the conversion of files from RGB (red, green, blue) into files of CMYK (cyan, magenta, yellow, and black).

Of particular interest in high speed ink jet printing system applications are the use of a set of one dimensional LUT's. Each one dimensional LUT independently transforms a specific color plane of a color image file into a new color plane of data that is tone corrected and ink limited. Such a technique is disclosed an claimed in commonly assigned, co-pending application Ser. No. 08/550,958, totally incorporated herein by reference. These tone correction transformations assure that there is a gradual and linearly increasing change in tone over the dynamic range of the printing system. These tables also transform the input data so as to limit the total amount of ink applied to the substrate. This feature, also disclosed in commonly assigned co-pending application Ser. No. 08/550,958, assures ink and substrate compatibility.

Unfortunately, some existing transformations render the printer imaging data with undesirable artifacts. At other times, the transformed data loses some necessary feature of the original image data. It is not the one dimensional LUT's themselves that cause these artifacts. Rather, it is the processes occurring after these transformations that further reduce the image data from continuous tone into binary files that can be imaged by the digital printing device.

It would be desirable to be able to know in advance the relationship between the transformed continuous tone image data and the resulting binary representation, on a level by level basis. This would allow for restriction, modification, or other alteration of the continuous tone data prior to reduction to the binary level. This is done for the purpose of optimizing the binary image file by eliminating unwanted artifacts and forcing desired dot structures in areas of the image where such modifications are deemed advantageous.

SUMMARY OF THE INVENTION

The present invention proposes processing continuous tone image data in a preferential way for imaging on a digital output device. In particular, knowledge of image quality degradation as a result of predefined color dispersion techniques, such as dither matrices and error diffusion, can be purposefully avoided by the judicious selection of preferred level transformations in the image processing workflow. The use of "reserved" levels for certain specified image content assures that data manipulation to the binary level does not adversely affect image quality.

In accordance with one aspect of the present invention, problems encountered in the conversion of continuous tone data into binary data for printing on low resolution imaging systems are addressed. Representation of the continuous tone data is only roughly approximated through the conversion to binary data. Artifacts of the binary printing process are objectionable for several reasons. They decrease over all image quality and may sometimes allow for only partial representation of the original data. Partially formed and/or irregularly formed text characters are one such example. This invention addresses this problem by forcing certain levels to be processed through predictable dot dispersion patterns so as to preserve preidentified portions of the input data stream.

Other objects and advantages of the invention will be apparent from the following description, the accompanying drawings and the appended claims.

DETAILED DESCRIPTION OF THE PREFERRED EMBODIMENTS

Figure 1:
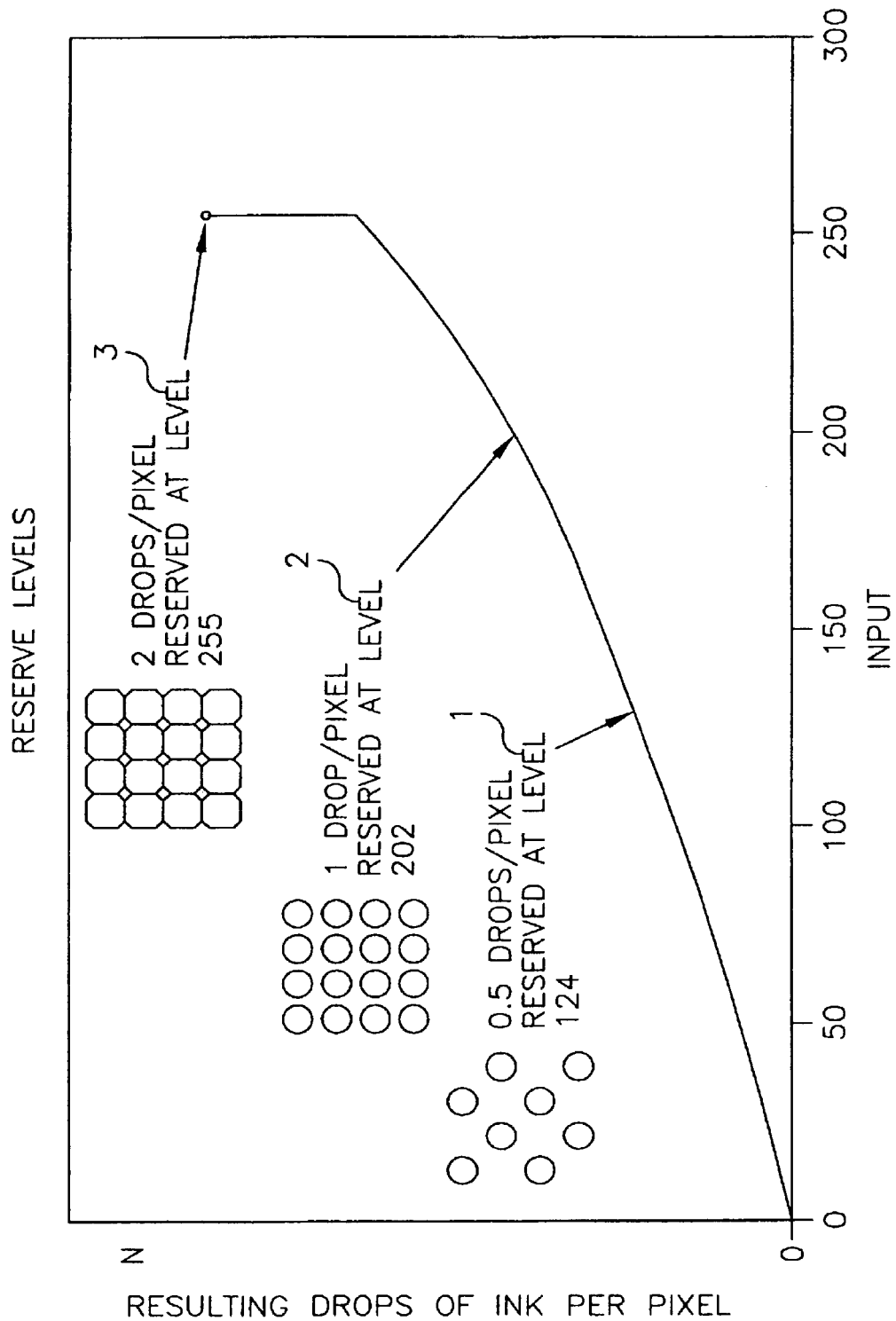
FIG. 1 is a graphical representation of a transformation curve of reserve levels and resulting drops of ink per pixel.

The present invention proposes optimizing data specific image quality from a low resolution printing system, with the goal of eliminating unwanted artifacts in low resolution digital imaging devices. High speed continuous ink jet printing systems typically exhibit such artifacts. These artifacts are a result of the droplet dispersion techniques applied to the continuous tone image data. Color images are made of individual color planes of data for each of the primary colors (cyan, magenta, yellow, and black). Considerable prior art has been developed to equally distribute the droplets within a given tonal area. However, if the individual droplets are large enough to be visible to the naked eye, some graininess, or patterning can not be avoided. This is particularly evident in the highlight areas of an image where there are relatively few printed drops in a given area. The graininess structure is typically compounded by the interaction of dot patterns from two different colors that may form repetitive patterns with each other. For example, a pattern of dots on top of each other, followed by dots beside each other are particularly noticeable. As a further example, small alignment shifts between the color planes from two different printheads can dramatically influence the resulting image quality by changing the distribution of ink on the substrate from "dot beside dot" to "dot on top of dot" patterns. Unfortunately, many commercial printing applications contain data that results in this problem. Highlight to midtone background colors, made up of more than one primary color, are very typical in color advertisements and the like.

Another particular problem with low resolution printing systems that use droplet dispersion techniques to reproduce a continuous tone scale is the printing of text. By design, dither and error diffusion techniques make up the tone scale by selectively placing ink in only a portion of the available pixel locations. In order to print fully formed text characters, droplets must be placed in every pixel defined by the font character. Trying to print mid-tone text through such algorithms produces characters with missing pixels. Ink coverage limiting transformations, used prior to the application of the droplet dispersion algorithms, can result in the same phenomenon. All the drops are simply not available for printing.

The problems introduced by drop dispersion data methods can be solved by identifying problem tone levels prior to application of these drop dispersion techniques. These problem areas are typically determined experimentally by printing the entire tone range of each of the primary colors and their interaction with specific primary tone representations overprint from the other colors in the imaging system. One skilled in the art can appreciate that any number of test patterns can be devised to identify specific droplet interaction artifacts. It is also understood however, that it is nearly impossible to identify and eliminate all such interactions and associated artifacts. The test targets need to be application specific.

Once it is know which tone levels cause a particular enhancement or degradation in image quality, those specific levels need to be favored or avoided accordingly. The use of one dimensional data transformation tables, operating on each of the primary colors independently, can accomplish this task. These tables or LUT's, such as are disclosed in commonly assigned, co-pending patent application Ser. No. 08/550,958, are typically used to linearize the tone scale and limit the total ink coverage on the substrate. These same tables can be modified to reserve and/or eliminate certain tone levels.

It is well know that error diffusion algorithms for halftoning tend to produce the better looking images than ordered dithers algorithms. Unfortunately at some density levels, error diffusion can produce annoying artifacts. If one density level, J, is know to have artifacts while an adjacent density level, K, is free of such artifacts, the LUT can be modified to shift the printed tone levels from level J to level K. In this way, the level J artifacts can be eliminated. It is recognized that this transformation would produce a shift of the printed tone. In many applications such a tone shift is less objectionable than the artifact which is eliminated by the transform.

FIG. 1 illustrates this concept according to the present invention. In this example, level 125 is know to print artifact free. The adjacent levels, 123, 124, 126, and 127 are know to produce artifacts when printed. Therefore the LUT has been modified to output the level 125 when any of these artifact producing levels were input. In this way, the artifact producing levels are avoided with only a minimal change in tone level.

By way of example only, in this case, the image file data is plotted against the resulting amount of ink that is to be printed in order to achieve the required tone level. Three separate regions 1, 2, and 3 are illustrated on the graph of FIG. 1. These regions serve as an example of certain tone levels that one may wish to reserve for specific applications. Level 1 image file data produces an odd/even dot pattern when reduced to the binary level. This level is particularly good for background colors and is less sensitive to color-to-color registration. All the background image data may be set to this tone level to assure optimal quality. It is also possible to map the adjacent levels in the tone scale curve to the same pattern to assure that a range of input values are optimally represented in the printed output. This can be done in a localized area without adversely affecting the overall tone quality. In accordance with the present invention, it is preferred not to introduce any strong discontinuities in the tone curve in order to avoid contouring or posturization in the printed image.

In a similar fashion, level 2 represents a homogenous grid of dots. It may be used as the minimum threshold for text printing. Level 2 addresses every pixel so as to assure fully formed characters.

Level 3 is the maximum density produced by a given inking system. The maximum density may be well beyond the ink cutoff threshold required for full color imaging. As such, level 3 can be reserved specifically for line art and dense text, provided that the imaged data does not contain this highest level of the tone scale. In order to assure this condition, the image data is preferably preprocessed to eliminate the darkest tone level, thereby avoiding this discontinuity in the tone scale.

The present invention defines the use of a single tone scale curve for both text and graphics, with reserved and deleted levels. One skilled in the art will appreciate that this technique can be extended to a number of circumstances where it is desired to produce a specific droplet pattern in the midst of a continuous tone that is represented by predefinable droplet dispersion patterns.

The invention has been described in detail with particular reference to certain preferred embodiments thereof, but it will be understood that modifications and variations can be effected within the spirit and scope of the invention.

What is claimed is:

1. A method for processing continuous tone image data for imaging on a digital output device, the method comprising the steps of:

identifying advantageous tone levels in the binary representation of the image;

generating predetermined continuous tone data levels based on the identified advantageous tone levels; and applying data transformation to the predetermined continuous tone data levels to purposefully select identified advantageous binary tone levels for enhancing a binary representation of the image data.

2. A method claimed in claim 1 wherein specific binary levels that result m full coverage of an area are applied via data transformation to continuous tone text data to assure full character formation in the binary representation.

3. A method for processing continuous tone image data for imaging on a digital output device, the method comprising the steps of:

identifying at least one problematic tone level in the binary representation of the image;

identifying at least one non-problematic tone level in the binary representation of the image;

generating predetermined continuous tone levels based on the at least one identified problematic tone level; and generating predetermined continuous tone data levels based on the at least one identified non-problematic tone level; and applying data transformation to cause the digital output device to replace the at least one problematic tone level in the binary representation of the image with output at the at least one non-problematic tone level in the binary representation of the image.

4. A method as claimed in claim 3 wherein several adjacent levels in the predetermined continuous tone levels based on the at least one identified problematic tone level are assigned a same specific tone level that corresponds with a binary representation that avoids undesirable artifacts.

5. A method as claimed in claim 3 wherein specific binary levels that result in full coverage of an area are applied via data transformation to continuous tone text data to assure fun character formation in the binary representation.

* * * * *